United States Patent
Watanabe

(10) Patent No.: US 9,063,022 B2
(45) Date of Patent: Jun. 23, 2015

(54) WARM-UP OPERATION DISPLAY DEVICE OF CHASSIS DYNAMOMETER SYSTEM

(75) Inventor: Kenji Watanabe, Ota (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 14/002,562

(22) PCT Filed: Mar. 2, 2012

(86) PCT No.: PCT/JP2012/055453
§ 371 (c)(1),
(2), (4) Date: Aug. 30, 2013

(87) PCT Pub. No.: WO2012/121170
PCT Pub. Date: Sep. 13, 2012

(65) Prior Publication Data
US 2013/0333486 A1    Dec. 19, 2013

(30) Foreign Application Priority Data

Mar. 4, 2011    (JP) .................................. 2011-047121

(51) Int. Cl.
| | | |
|---|---|---|
| G01L 1/00 | (2006.01) | |
| G01M 17/007 | (2006.01) | |
| G01M 15/02 | (2006.01) | |

(52) U.S. Cl.
CPC .............. *G01L 1/00* (2013.01); *G01M 17/0074* (2013.01); *G01M 15/02* (2013.01)

(58) Field of Classification Search
CPC ............................. G01L 1/00; G01M 17/0074
See application file for complete search history.

(56) References Cited

U.S. PATENT DOCUMENTS

| | | |
|---|---|---|
| 2007/0118258 A1 | 5/2007 | Probst et al. |
| 2013/0338957 A1 | 12/2013 | Watanabe |
| 2013/0339892 A1 | 12/2013 | Watanabe et al. |

FOREIGN PATENT DOCUMENTS

| | | |
|---|---|---|
| JP | 02-021234 A | 1/1990 |
| JP | 05-087554 U | 11/1993 |
| JP | 08-278232 A | 10/1996 |

(Continued)

OTHER PUBLICATIONS

K. Watanabe et al, "Dynamometer System Tokushu Shin Gijutsu Shin Seihin Seigyo Keisoku System MEIDACS-DY6000P", Meiden Jiho, No. 4, Jul. 31, 2003, pp. 26-30.

*Primary Examiner* — Lisa Caputo
*Assistant Examiner* — Brandi N Hopkins
(74) *Attorney, Agent, or Firm* — Foley & Lardner LLP

(57) ABSTRACT

When a warm-up operation at a set speed is carried out to measure a mechanical loss that is generated during warm-up operation, a device to display setting of operation time, vehicle speed, etc. and the operation status on a single window is demanded. An operation display portion on a top display screen provided on a control terminal includes a menu function block having a warm-up window calling section for calling a warm-up operation window function block. The warm-up operation window function block includes a warm-up condition setting section configured to set a warm-up operation condition, a measurement flow indicating block configured to indicate a warm-up operation by a pattern, a trend indicating section configured to indicate a braking force that is generated upon the warm-up operation in time sequence, and a measurement status indicating block comprising a judgment indicating section configured to indicate measurement results.

5 Claims, 4 Drawing Sheets

Diagram of the warm-up operation window

(56) References Cited

FOREIGN PATENT DOCUMENTS

| JP | 10-281940 A | 10/1998 |
|---|---|---|
| JP | 2004-309290 A | 11/2004 |
| JP | 2005-010124 A | 1/2005 |
| JP | 2005-049353 A | 2/2005 |
| JP | 04-039296 B2 | 11/2007 |
| JP | 2008-082857 A | 4/2008 |
| JP | 2008-224403 A | 9/2008 |
| JP | 2009198480 * | 9/2009 |
| JP | 2011-027478 A | 2/2011 |

* cited by examiner

Diagram of the warm-up operation window

FIG. 3

Constitution of menu function block

| Vehicle data list | Warm up |
|---|---|
| Limit monitor setting | Monitor menu |
| Maintenance menu | Measurement |
| | |

WARM-UP OPERATION DISPLAY DEVICE OF CHASSIS DYNAMOMETER SYSTEM

TECHNICAL FIELD

The present invention relates to a warm-up operation display device of a chassis dynamometer system.

BACKGROUND ART

FIG. 4 is a diagram showing a schematic configuration of a chassis dynamometer system.

Reference sign Rf denotes a roller for a front wheel of a test vehicle on which the front wheel is set. Reference sign Rr denotes a roller for a rear wheel of the test vehicle on which the rear wheel is loaded. A dynamometer (not shown) as a load is coupled to each of the rollers Rf, Rr for the front and rear wheels. Reference signs IV1, IV2 denote inverter boards through which each of the dynamometers is controlled on the basis of a predetermined set value, a speed signal detected by a speed detector Sd and the like. Reference sign PLC denotes a switchgear panel through which on/off control of switchgear for turning on or off a power supply of an auxiliary equipment such as a blower B1 is carried out. Reference sign Op denotes a controller such as a sequencer. Setting and operation of the controller are carried out through a control terminal (PC). The controller (Op), the control terminal (PC) and the like serve to constitute a console.

In a case where an evaluation test of a vehicle is performed by a chassis dynamometer system, a warm-up operation of a sole chassis dynamometer or both the chassis dynamometer and the vehicle is carried out at a set speed for a predetermined time period in order to stabilize a mechanical loss of the sole chassis dynamometer or both the chassis dynamometer and the vehicle. The warm-up operation is described in Patent Literature 1.

CITATION LIST

Patent Literature

Patent Literature 1: Japanese Patent Application Unexamined Publication No. 10-281940

SUMMARY OF THE INVENTION

In a case where an evaluation test is performed by a chassis dynamometer system as shown in FIG. 4, a predetermined evaluation test is carried out while watching a display screen provided on a control terminal PC. However, there is no display device that indicates setting of an operation time, a vehicle speed, etc. upon a warm-up operation in the evaluation test, a current operation status based on the setting thereof, and a result of the warm-up operation on a single screen. Therefore, an operability upon the warm-up operation is lowered, and a prolonged time is required to carry out the evaluation test by an operator.

An object of the present invention is to provide a warm-up operation display device capable of recognizing indication or display of a set value and a current operation status.

According to one aspect of the present invention, there is provided a warm-up operation display device of a chassis dynamometer system, the chassis dynamometer system serving to warm up a sole chassis dynamometer or both the chassis dynamometer and a vehicle to be tested at a set speed by an operation command outputted from a console of the chassis dynamometer system to an object to be warmed up, the warm-up operation display device including:
  a warm-up window calling section configured to call a warm-up operation window on a display screen of the console,
  the warm-up operation window including:
    a warm-up condition setting block configured to set a warm-up operation condition;
    a measurement flow indicating block configured to indicate a warm-up operation by a pattern; and
    a measurement status indicating block comprising a judgment indicating section configured to indicate measurement results upon the warm-up operation.

According to other aspect of the present invention, there is provided the warm-up operation display device of a chassis dynamometer system in which the warm-up operation window further includes a trend indicating section configured to indicate a braking force that is generated upon the warm-up operation, in time sequence.

According to another aspect of the present invention, there is provided the warm-up operation display device of a chassis dynamometer system in which the warm-up condition setting block includes an operating method setting section configured to select a chassis dynamometer operation or a vehicle operation, and a warm-up condition setting section configured to indicate a set warm-up time, a set value of vehicle speed and a stability judgment reference value.

According to a still another aspect of the present invention, there is provided the warm-up operation display device of a chassis dynamometer system in which the measurement status indicating block includes at least one of a vehicle speed monitor section and a braking force monitor section.

According to a still other aspect of the present invention, there is provided the warm-up operation display device of a chassis dynamometer system in which the measurement flow indicating block is configured to indicate a current operation status on the pattern.

BRIEF DESCRIPTION OF DRAWINGS

FIG. 3 is a diagram showing a function configuration of a top menu function block of the operation display portion of the present invention.

BEST MODE FOR CARRYING OUT THE INVENTION

Figure 2:
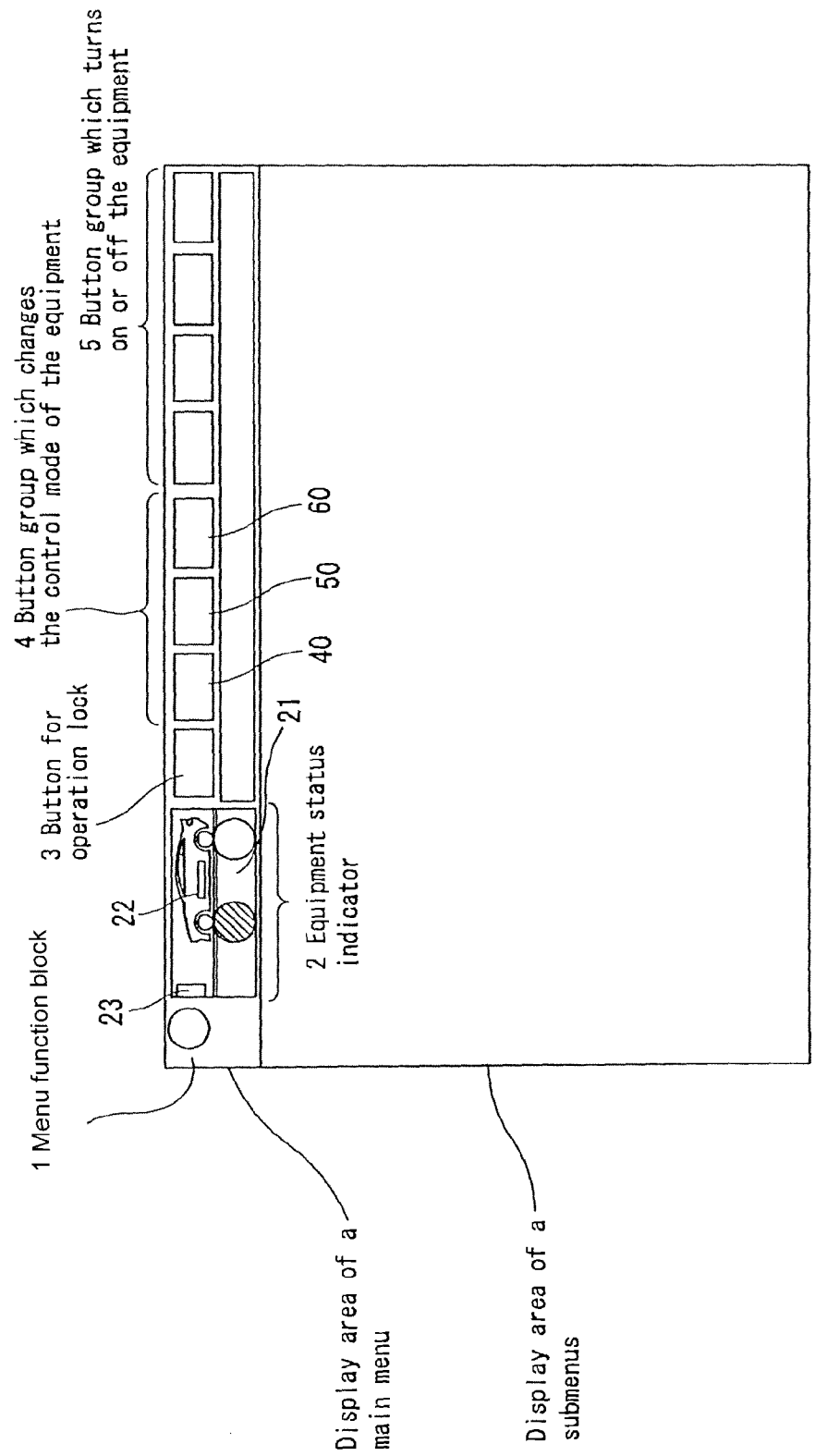
FIG. 2 is a diagram showing a constitution of an operation display portion of the operation display device of the present invention.
Figure 4:
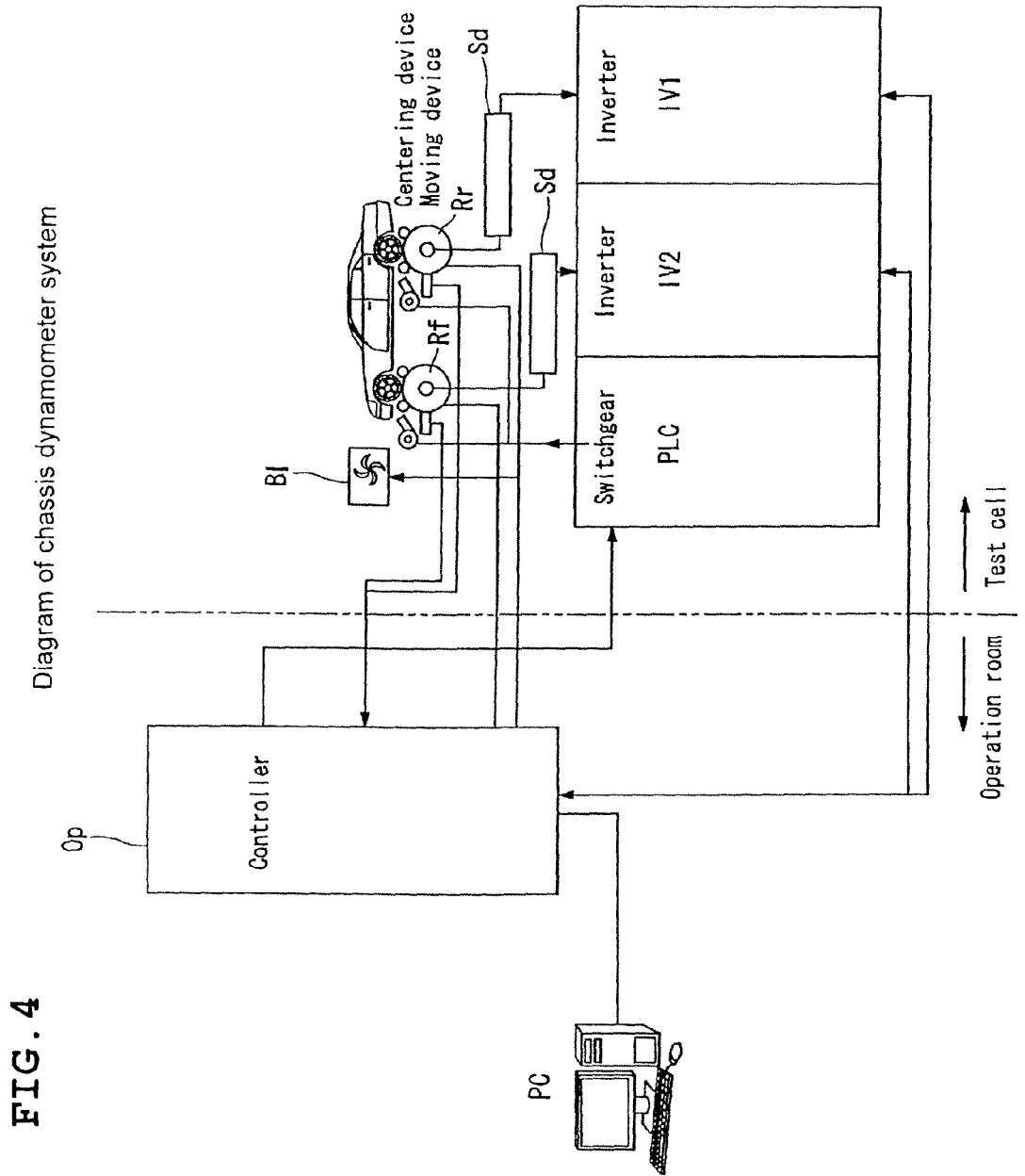
FIG. 4 is a diagram showing a configuration of a chassis dynamometer system.

FIG. 2 shows an operation display portion provided on a control terminal of a warm-up operation display device according to the present invention, and an example of a screen display configuration (an operation window) on the operation display portion. A main menu display area on the operation display portion includes a menu function block 1, a status indicating function block (equipment status indicator) 2 that indicates a status of equipments of a chassis dynamometer, an operation lock function block (buttons for operation lock) 3, a mode setting function button group 4 and an equipment on/off changeover function button group 5. These function blocks and function button groups are selected with a mouseclick or a touch-panel operation. As shown in FIG. 3, the menu function block 1 includes a vehicle ID window calling section "Vehicle data list", an alarm setting window calling section "Limit monitor setting", a maintenance menu calling section "Maintenance menu", a warm-up window calling section "Warm up", a monitor window calling section "Monitor menu" and a measurement window calling section "Measurement".

Figure 1:
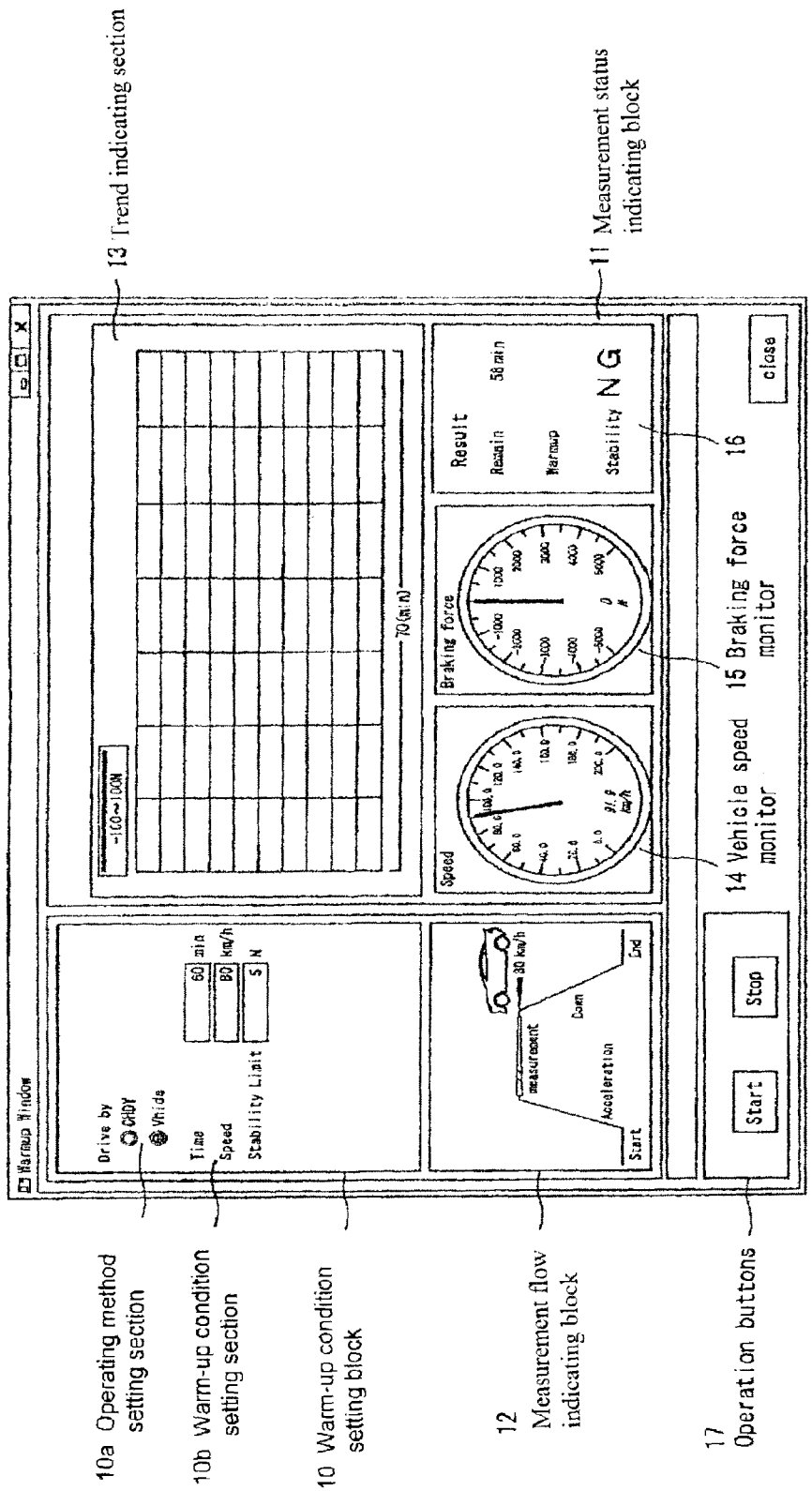
FIG. 1 is a diagram showing a constitution of a warm-up operation window of a warm-up operation display device according to an embodiment of the present invention.

FIG. 1 is a diagram showing a warm-up operation window called by the warm-up window calling section. Reference numeral 10 denotes a warm-up condition setting block configured to set a warm-up operation condition. The warm-up condition setting block 10 includes an operating method setting section 10a configured to select an operation of the sole chassis dynamometer or a simultaneous operation of the chassis dynamometer and a vehicle, and a warm-up condition setting section 10b configured to input and indicate a set warm-up time, a set value of vehicle speed and a stability judgment reference value.

Reference numeral 12 denote a measurement flow indicating block (operation status indicator) configured to indicate a warm-up operation execution pattern and a current operation status. The measurement flow indicating block 12 includes a combined pattern constituted of measurement patterns of acceleration, set speed and deceleration, and is configured to vary color, contrast, etc. of indications along the measurement patterns of acceleration, set speed and deceleration on the combined pattern in accordance with a current progress position of measurement and thereby visually recognize the progress position of measurement.

Reference numeral 13 denotes a trend indicating section (chart) for indicating a trend in operation status. The trend indicating section 13 is configured to indicate a braking force (detection torque) corresponding to an operation time in real time in a graph having abscissa representing time and ordinate representing braking force. Reference numeral 14 denotes a vehicle speed monitor section (vehicle speed monitor) configured to indicate a vehicle speed under measurement in analog form. Reference numeral 15 denotes a braking force monitor section (braking force monitor). Reference numeral 16 denotes a judgment indicating section (result indicator) configured to indicate measurement results and specifically indicate a remaining time, a judgment result as to whether or not the warm-up operation has been completed, and a judgment result as to whether or not the braking force has been stabilized. Reference numeral 17 denotes an operation switch section (operation buttons) configured to carry out start and forced termination of the warm-up operation by operating switches (buttons). Among these sections 14-16 constituting a measurement status indicating block 11, the analog indications in the vehicle speed monitor section 14 and the braking force monitor section 15 may be omitted since they are also recognizable from the measurement flow indicating block 12 and the trend indicating section 13.

The status indicating function block 2 as shown in FIG. 2 is a block configured to indicate a setting status of the chassis dynamometer as currently set. The status indicating function block 2 includes an indicator section 21 configured to indicate use/non-use of front and rear rollers, a vehicle speed indicator section 22 and an indicator section 23 configured to indicate use/non-use of a cooling fan.

The mode setting function button group 4 is provided with a vehicle type selection window calling function block 40. The vehicle type selection window calling function block 40 includes a manual operation window calling function block 50 and a cooling fan operation mode selecting function block 60. The equipment on/off changeover function button group 5 has selection functions to directly control equipments of the test facilities, such as a function of selecting on/off status of the cooling fan, a function of selecting lock/release status of the rollers, a function of selecting on/off status of auxiliary equipments, and a function of selecting on/off status of a dynamometer power supply.

Next, the menu function block according to the present invention is explained. When an operator turns on a power supply of the warm-up operation display device, the window in the operation display portion appears as shown in FIG. 2. In the status indicating function block 2, a setting status of the chassis dynamometer as currently set is indicated. For instance, in a case where the vehicle type as previously set is front-wheel drive and rollers of the chassis dynamometer as previously set are rollers for the front-wheel drive, a brightness of only a front roller icon among front and rear roller icons indicated in the status indicating function block 2 is intensified (as indicated by shading in FIG. 2) so that the front roller icon is indicated in a display state different from that of the rear roller icon.

When the cooling fan located forward of the roller (the vehicle) in the cooling fan use/non-use indicator section 23 of the status indicating function block 2 is in ON state, a pictorial display simulating the cooling fan is indicated with brightness in the cooling fan use/non-use indicator section 23. Thus, the ON state of the cooling fan can be visually recognized.

Further, vehicle speed under a test can be indicated with a digital display in the vehicle speed indicator section 22. In addition, in a case where a changeover of the cooling fan to OFF state is demanded, a cooling fan on/off selection function (button) provided in the equipment on/off changeover function button group 5 is switched to an ineffective state by a click operation so that the brightened pictorial display simulating the cooling fan in the cooling fan use/non-use indicator section 23 immediately disappears.

Accordingly, with the arrangement in which the status indicating function block 2 is disposed at the top of the operation display portion on the display screen, the current equipment construction and a speed status upon carrying out a test can be visually recognized. In addition, change of the on/off state of the cooling fan can be instantaneously reflected.

Next, an operation of the warm-up operation display device according to the present invention upon carrying out a warm-up operation is explained.

When the menu function block 1 is selected upon carrying out a warm-up operation, the function calling window as shown in FIG. 3 appears. Then, when the warm-up window calling section (Warm up) of the function calling window is selected, a diagram of a warm-up operation window constitution as shown in FIG. 1 is indicated. The warm-up condition setting block 10 at the time of being called is in an inputable status. At this time, in the operating method setting section 10a, a warm-up operation of the sole chassis dynamometer or a simultaneous warm-up operation of both the chassis dynamometer and the vehicle is selected. For instance, in a case where the warm-up operation of the sole chassis dynamometer as the operating method is carried out, a selection button "CHDY" is clicked to thereby display such an indication that the selection button (radio button) has been selected. After that, in the warm-up condition setting section 10b, set values are inputted through an input section such as a keyboard of the control terminal of the chassis dynamometer system.

In this embodiment as shown in FIG. 1, the warm-up time is set to 60 minutes, the vehicle speed is set to 80 km/h, and the stability judgment reference value is set to 5N, and the set values are indicated in the warm-up setting section 10b.

When the setting is thus completed, the warm-up operation is started by selecting a start button of the operation switch section 17. In addition, when the start button is selected, the values as set in the warm-up condition setting block 10 are fixed and cannot be changed until the warm-up is completed. In a case where change of the set values during the warm-up operation is demanded, a stop button of the operation switch section 17 is selected to thereby carry out forced termination of the warm-up operation and enable the operator to re-input setting of the warm-up condition.

When the warm-up operation is started, an operation process such as an acceleration process, a set speed running process and the like is indicated in the measurement flow indicating block 12 so that the progress status can be recognized. Further, the vehicle speed and the braking force in the operation process can be indicated and recognized in real time in the vehicle speed monitor section 14 and the braking force monitor section 15, respectively. In addition, the braking force corresponding to the operation time can be recognized in time sequence by the trend indicating section 13. Accordingly, when a warm-up operation of the object to be warmed up which is set by the operation method setting section 10*a* is carried out at a set speed (80 km/h in this embodiment), a process of stabilizing the braking force (the mechanical loss, etc.) can be recognized at sight.

Further, in the judgment indicating section 16, the remaining time is indicated at a numerical value, and the judgment result as to whether or not the warm-up has been completed and the judgment result as to whether or not the braking force has been stabilized are each indicated with letters "OK" or "NG".

As explained above, in the warm-up operation display device according to the present invention, it is possible to recognize a successive process from the setting for the warm-up operation through the progress and termination of the measurement up to the judgment of the measurement results on a single window. Therefore, a visibility of the measurement operation can be enhanced. Accordingly, an operability of the warm-up operation display device by the operator can be enhanced, and setting of conditions of the warm-up operation can be readily carried out. As a result, an erroneous operation by the operator can be suppressed, and a time required for the measurement operation can be reduced.

The invention claimed is:

1. A warm-up operation display device of a chassis dynamometer system, the chassis dynamometer system serving to warm up a sole chassis dynamometer or both the chassis dynamometer and a vehicle to be tested at a set speed by an operation command outputted from a console of the chassis dynamometer system to an object to be warmed up, the warm-up operation display device comprising:
   a warm-up window calling section configured to call a warm-up operation window on a display screen of the console,
   the warm-up operation window comprising:
      a warm-up condition setting block configured to set a warm-up operation condition;
      a measurement flow indicating block configured to indicate a warm-up operation by a pattern; and
      a measurement status indicating block comprising a judgment indicating section configured to indicate measurement results upon the warm-up operation.

2. The warm-up operation display device of a chassis dynamometer system as claimed in claim 1, wherein the warm-up operation window further comprises a trend indicating section configured to indicate a braking force that is generated upon the warm-up operation, in time sequence.

3. The warm-up operation display device of a chassis dynamometer system as claimed in claim 1, wherein the warm-up condition setting block comprises an operating method setting section configured to select a chassis dynamometer operation or a vehicle operation, and a warm-up condition setting section configured to indicate a set warm-up time, a set value of vehicle speed and a stability judgment reference value.

4. The warm-up operation display device of a chassis dynamometer system as claimed in claim 1, wherein the measurement status indicating block comprises at least one of a vehicle speed monitor section and a braking force monitor section.

5. The warm-up operation display device of a chassis dynamometer system as claimed in claim 1, wherein the measurement flow indicating block is configured to indicate a current operation status on the pattern.

* * * * *